(12) United States Patent
Avci et al.

(10) Patent No.: US 12,639,714 B1
(45) Date of Patent: May 26, 2026

(54) TOKEN-BASED BIOMETRIC PAYMENT PROCESSING SYSTEM

(71) Applicant: AMAZON TECHNOLOGIES, INC., Seattle, WA (US)

(72) Inventors: Tamer Avci, Seattle, WA (US); Priyank Gandhi, Fremont, CA (US); Aditya Goel, Seattle, WA (US); Aneeta Bhattacharyya, Sammamish, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 12 days.

(21) Appl. No.: 18/756,782

(22) Filed: Jun. 27, 2024

(51) Int. Cl.
*G06Q 20/40* (2012.01)
*H04L 9/32* (2006.01)

(52) U.S. Cl.
CPC ..... *G06Q 20/40145* (2013.01); *H04L 9/3297* (2013.01)

(58) Field of Classification Search
None
See application file for complete search history.

(56) References Cited

U.S. PATENT DOCUMENTS

2022/0044252 A1* 2/2022 Abouelenin .......... H04L 9/3231

OTHER PUBLICATIONS

"Mifare Classic® EV1 1K - 4K", NXP Semiconductors, 7 pgs. Retrieved from the Internet: URL: https://www.nxp.com/products/ rfid-nfc/mifare-hf/mifare-classic/mifare-classic-ev1-1k-4k:MF1S50YYX_V1.

"MF1S70YYX_V1, Mifare Classic EV1 4K—Mainstream contactless smart card IC for fast and easy solution development", Mifare Classic, 37 pgs. Retrieved from the Internet: URL: https://www.nxp.com/docs/en/data-sheet/MF1S70YYX_V1.pdf.

"X25519", 9 pgs. Retrieved from the Internet: URL: https://www.cryptopp.com/wiki/X25519.

Bernstein, D.J., "A state-of-the-art Diffie-Hellman function", 4 pgs. Retrieved from the Internet URL: https://cr.yp.to/ecdh.html.

Brown, Daniel R.L., "Standards for Efficient Cryptography, SEC 1: Elliptic Curve Cryptography", Certicom Research, May 21, 2009, 144 pgs. Retrieved from the Internet: URL: http://www.secg.org/sec1-v2.pdf.

* cited by examiner

*Primary Examiner* — Matthew S Gart
*Assistant Examiner* — Amit Patel
(74) *Attorney, Agent, or Firm* — Lindauer Law, PLLC

(57) ABSTRACT

A token-based biometric payment processing system facilitates point-of-sale (POS) processing of payments. A biometric identification provider (BIP) receives a single-use token (SUT) from a payment processor (PP). The SUT is associated at the PP with a payment account on file (PAOF) and with an identity at the BIP. Upon identification at a scanner by the BIP, the SUT is processed to generate payment data (PMT) that is secured. The PMT is sent to the scanner, which forwards the PMT to a PP terminal using a communication interface and protocol. The communication interface and protocol may use existing contactless approaches, such as those used for mass transit cards, allowing the scanner to communicate with a wide array of PP terminals. The PP terminal then sends the PMT on to the PP. The PP receives the PMT and, if the PMT is valid, initiates a transaction to transfer funds from the PAOF.

20 Claims, 5 Drawing Sheets

Figure 3:
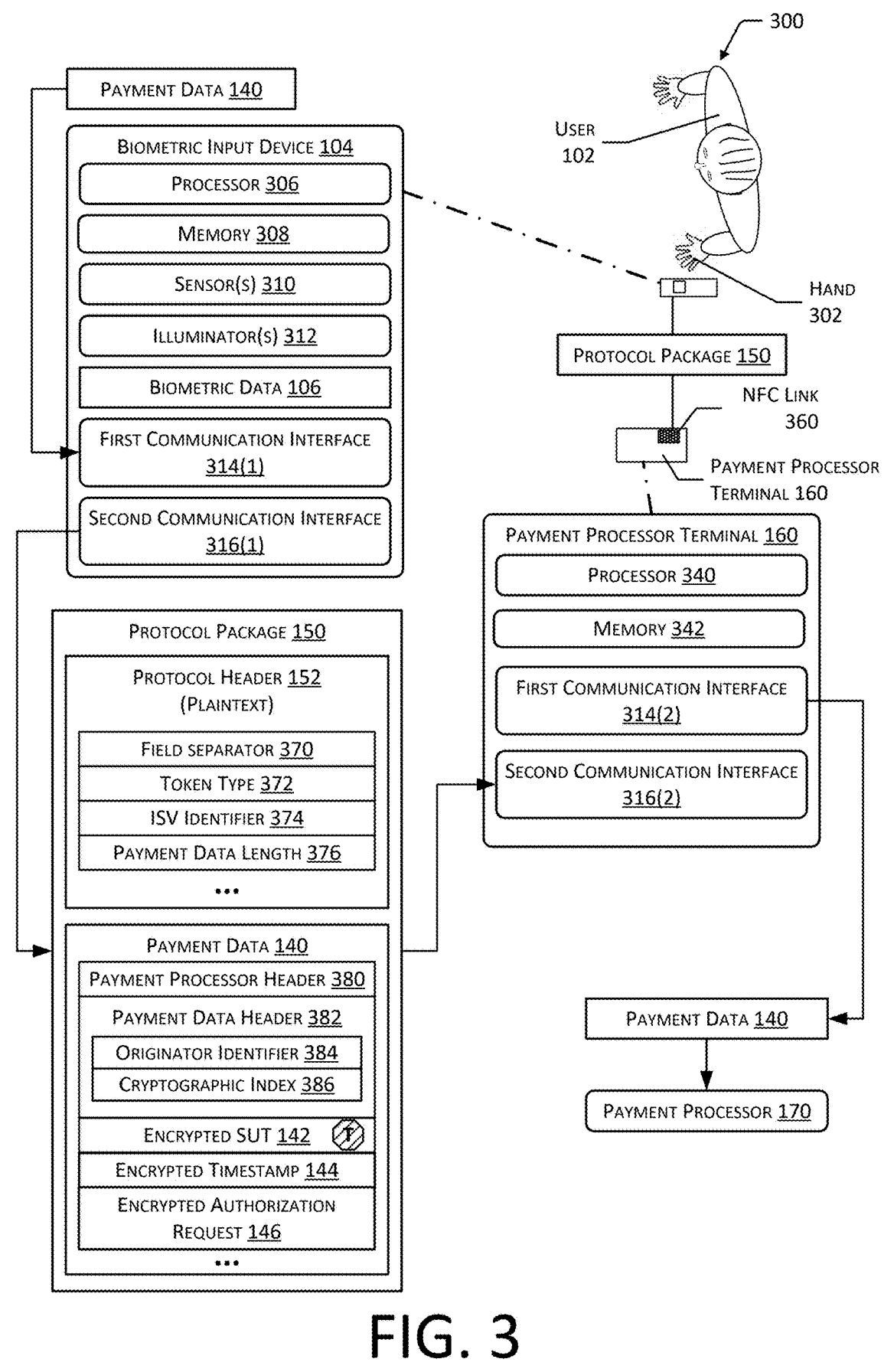

300

USER
102

HAND
302

PAYMENT DATA 140

BIOMETRIC INPUT DEVICE 104

PROCESSOR 306

MEMORY 308

SENSOR(S) 310

ILLUMINATOR(S) 312

BIOMETRIC DATA 106

FIRST COMMUNICATION INTERFACE
314(1)

SECOND COMMUNICATION INTERFACE
316(1)

PROTOCOL PACKAGE 150

NFC LINK
360

PAYMENT PROCESSOR
TERMINAL 160

PAYMENT PROCESSOR TERMINAL 160

PROCESSOR 340

MEMORY 342

FIRST COMMUNICATION INTERFACE
314(2)

SECOND COMMUNICATION INTERFACE
316(2)

PROTOCOL PACKAGE 150

PROTOCOL HEADER 152
(PLAINTEXT)

FIELD SEPARATOR 370

TOKEN TYPE 372

ISV IDENTIFIER 374

PAYMENT DATA LENGTH 376

• • •

PAYMENT DATA 140

PAYMENT PROCESSOR HEADER 380

PAYMENT DATA HEADER 382

ORIGINATOR IDENTIFIER 384

CRYPTOGRAPHIC INDEX 386

ENCRYPTED SUT 142

ENCRYPTED TIMESTAMP 144

ENCRYPTED AUTHORIZATION
REQUEST 146

• • •

PAYMENT DATA 140

PAYMENT PROCESSOR 170

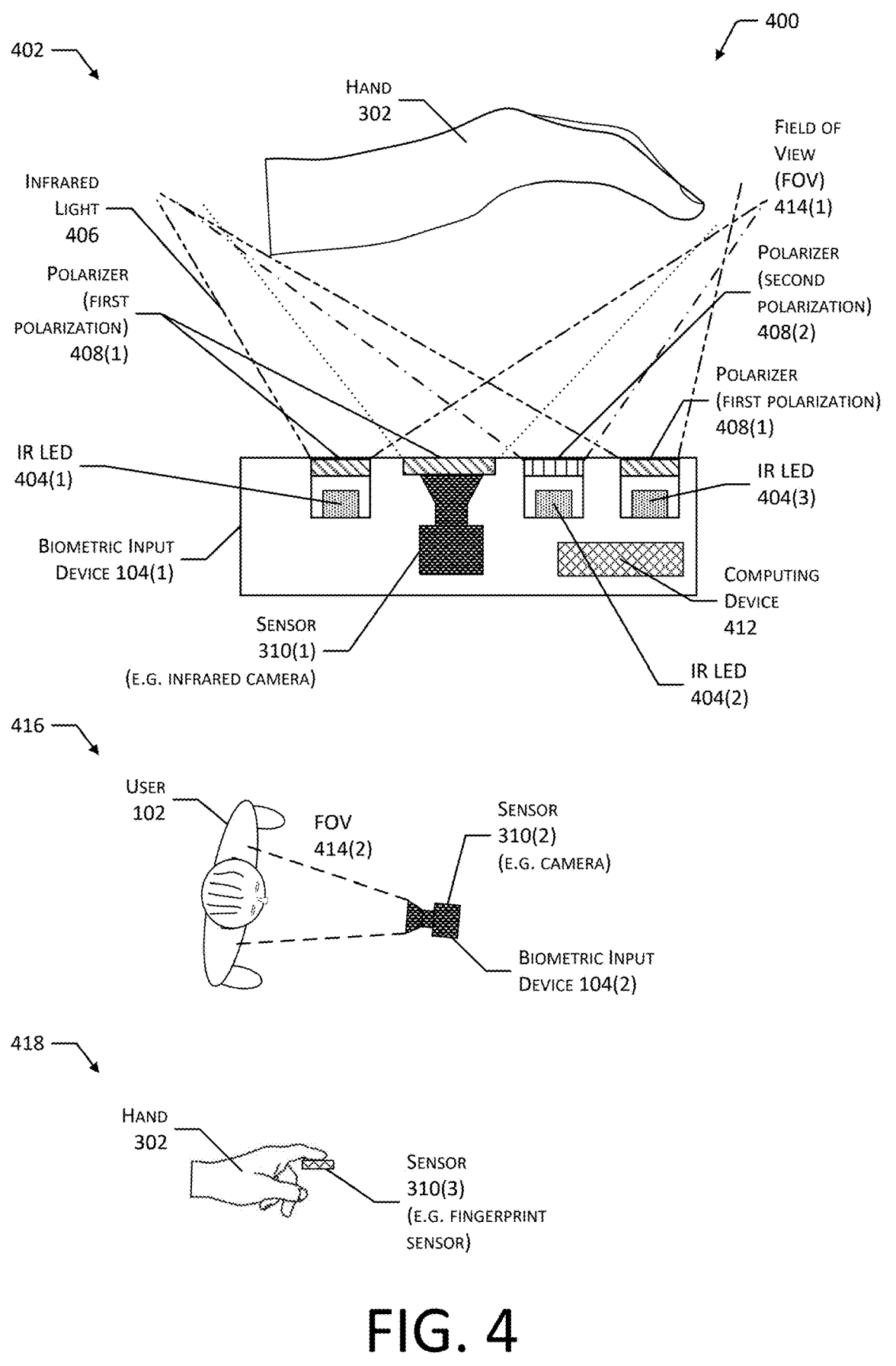

HAND
302

FIELD OF
VIEW
(FOV)
414(1)

INFRARED
LIGHT
406

POLARIZER
(SECOND
POLARIZATION)
408(2)

POLARIZER
(FIRST
POLARIZATION)
408(1)

POLARIZER
(FIRST POLARIZATION)
408(1)

IR LED
404(1)

IR LED
404(3)

BIOMETRIC INPUT
DEVICE 104(1)

COMPUTING
DEVICE
412

SENSOR
310(1)
(E.G. INFRARED CAMERA)

IR LED
404(2)

416

USER
102

FOV
414(2)

SENSOR
310(2)
(E.G. CAMERA)

BIOMETRIC INPUT
DEVICE 104(2)

418

HAND
302

SENSOR
310(3)
(E.G. FINGERPRINT
SENSOR)

FIG. 4

TOKEN-BASED BIOMETRIC PAYMENT PROCESSING SYSTEM

BACKGROUND

Facilities such as stores, offices, and so forth, may need the ability to accept payment from users.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features. The figures are not necessarily drawn to scale, and in some figures, the proportions or other aspects may be exaggerated to facilitate comprehension of particular aspects.

FIG. 3 illustrates a biometric input device, a protocol package, and a payment processing terminal, according to some implementations.

FIG. 4 illustrates biometric input devices that the payment system may use, according to some implementations.

Figure 1:
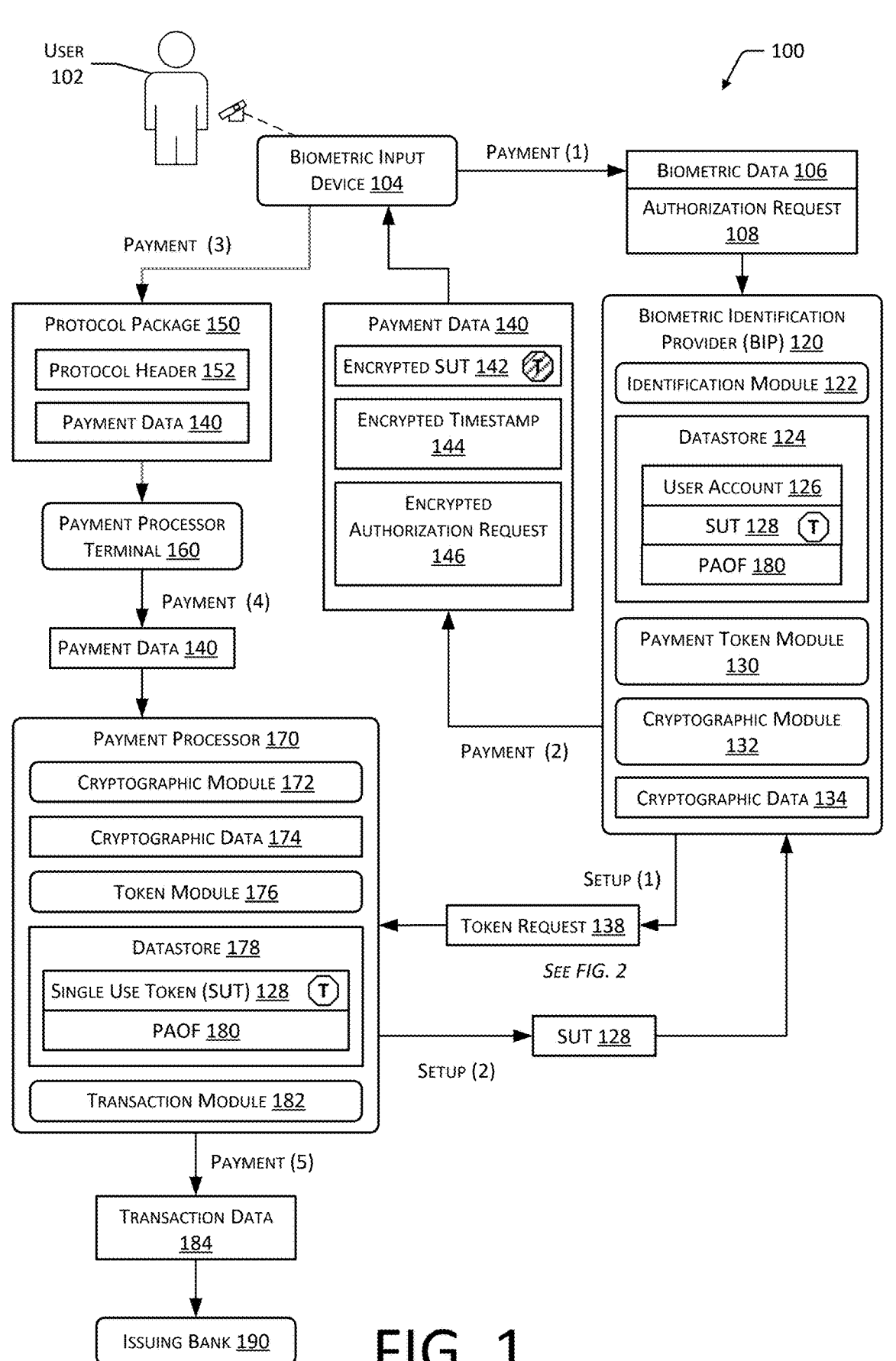
FIG. 1 illustrates a token-based biometric payment processing system, according to some implementations.

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. As used in this disclosure, letters in parenthesis such as "(P)" may indicate an integer value greater than or equal to zero.

DETAILED DESCRIPTION

Electronic payment modes, such as debit cards, credit cards, stored value cards, and so forth provide significant convenience in facilitating a transfer of value between parties. For example, a user may pay a merchant for goods and services using a credit card instead of having to carry cash.

Existing electronic payment modes typically have the user carrying a physical device such as a card, smartphone, fob, and so forth. To perform a payment, the user presents that physical device to a payment processor terminal (PPT). For example, the user may swipe a credit card that includes a magnetic stripe, insert a card with electrical contacts into a reader, place a contactless card proximate to a wireless interface, and so forth. The payment terminal then sends information obtained from the physical device to a payment processor for settlement of the transaction in which funds are transferred from one account to another.

The traditional infrastructure associated with electronic payments may include a point of sale (POS) system that determines a transaction amount and the PPT. In the traditional configuration, the PPT is connected to, or integrated with, the POS and receives the transaction amount from the POS. The PPT may then communicate with the payment processor to perform the transaction.

The installed hardware associated with this traditional infrastructure is extensive. Changes to this infrastructure are capital and time intensive. The addition of capabilities, such as payment using biometric identification, may benefit from improved adoption if the traditional infrastructure may be utilized by merchants. By using the biometric identification, the user is freed from having to carry the physical device, such as the card containing account information.

A biometric input device at the point of sale acquires the biometric data and may participate in the electronic payment. For example, the biometric input device may acquire biometric data, which is then sent to a biometric identification provider (BIP). During setup with the BIP, the user may have provided and stored a payment account on file (PAOF). If this PAOF is associated with a payment processor or issuing bank that supports host card emulation (HCE), HCE data may be sent to the biometric input device. The biometric input device may then use the HCE data to communicate with the PPT, providing payment information that is associated with the PAOF. The PPT uses this information to communicate with the payment processor, ultimately resulting in settlement of the transaction using the PAOF.

However, HCE may not be available in some circumstances. For example, HCE may not be enabled for use in a particular jurisdiction. In another example, the financial institution associated with the PAOF may not support HCE transactions. Such circumstances result in a situation in which the PAOF is not able to be used to settle the transaction, and so other mechanisms such as intermediary accounts may be used, introducing additional transactional loads and complexity, as well as incurring potential settlement risks.

Described in this disclosure is a token-based biometric payment processing system that is able to quickly and reliably complete payment transactions for users with a PAOF that does not support other protocols, such as HCE. The system described herein may be quickly and easily deployed allowing rapid adoption at minimal cost. The system is highly secure and is readily integrated into a wide variety of existing PPTs.

During setup with the BIP, the user provides a PAOF. For example, the PAOF may comprise a credit card, debit card, bank account, and so forth. If the PAOF does not support a particular protocol, such as HCE, the BIP sends a request and the PAOF to a participating payment processor. The payment processor stores the PAOF and generates a single use token (SUT). The SUT is associated with the PAOF. The SUT is returned to the BIP where it is stored for later use.

At a later time, the user authorizes payment at a merchant by providing biometric input using a biometric input device. The biometric input device uses a first communication interface to send biometric data and an authorization request to the BIP. The BIP prepares payment data that includes the SUT. The payment data is encrypted at the BIP. For example, the SUT and a timestamp associated with the generation of the payment data may be included in the payment data and encrypted. The payment data is then sent to the biometric input device.

The biometric input device determines a protocol package that comprises a protocol header and the payment data. The protocol package is then sent from the biometric input device to the PPT using a second communication interface. The second communication interface and the protocol used may be compliant with at least a portion of ISO/IEC 14443 as promulgated by the International Organization for Standardization (ISO) and the International Electrotechnical Commission (IEC). For example, this protocol may be used for contactless mass transit applications. By using a protocol such as ISO/IEC 14443 the biometric input device is able to communicate the payment data to a wide variety of different PPTs. Independently of any security measures associated with the protocol used to send the protocol package from the biometric input device to the PPT, the security of the payment data is maintained in several ways, including the use of an SUT and encryption.

The PPT receives the protocol package and may then send the payment data to the payment processor. The payment processor decrypts the payment data. Once decrypted, the SUT is compared to previously issued and stored SUTs or is otherwise assessed to determine validity. If the SUT is deemed to be valid, the PAOF that was stored with the payment processor may be used to settle the transaction.

By using the techniques described, a merchant is able to quickly and easily deploy a biometric identification system to facilitate user payments without the user presenting a physical device such as a card or fob. Communication between the biometric input device and the PPT may utilize a widely available protocol that allows for easy integration with existing PPTs. Overall implementation of the system provides robust security through the use of single-use tokens and various cryptographic techniques.

FIG. 1 illustrates a token-based biometric payment processing system (system) 100, according to some implementations. Unless otherwise indicated, data sent between the various parties or their associated devices may be encrypted.

In this illustration, connecting lines may include a number within parentheses that indicates an order of operations according to one implementation. For example, the operation of "Payment (1)" occurs before "Payment (2)". In other implementations, operations presented here may be performed in a different order or in some situations omitted. For ease of description, and not as a limitation, the term "bank" is used. It is understood that the techniques described may be used with regard to other financial institutions, such as credit unions, trust companies, mortgage loan companies, and so forth.

In the implementation shown, a user 102 provides biometric input to a biometric input device 104 that acquires biometric data 106. For example, the user 102 may present their hand. The biometric input device 104 may also determine other information, such as an authorization request 108. For example, the authorization request 108 may comprise one or more attributes indicative of a transaction identifier, type of transaction such as "purchase" or "return", currency, actual transaction value, placeholder transaction value, and so forth. In one implementation a point of sale (POS) system (not shown) may send at least a portion of the data associated with the authorization request 108, such as a transaction identifier, to the biometric input device 104. In another implementation a payment processor terminal (PPT) 160 may send at least a portion of the data associated with the authorization request 108 to the biometric input device 104. In another implementation the PPT 160 may receive data associated with the authorization request 108 from another device, such as receiving the type of transaction, currency, actual transaction value, and so forth from the POS system.

The biometric data 106 and the authorization request 108 are provided to a biometric identification provider (BIP) 120. In some implementations, the authorization request 108 may comprise the biometric data 106, or information based on the biometric data 106.

The BIP 120 may comprise an identification module 122, datastore 124, payment token module 130, cryptographic module 132, and associated cryptographic data 134. The datastore 124 may store user account(s) 126, single-use tokens (SUTs), payment account(s) on file (PAOF) 180, and so forth.

The BIP 120 stores or has access to the datastore 124 that includes the user account 126. The user account 126 may comprise information based on biometric data 106 obtained previously, such as during setup. The BIP 120 and setup is discussed in more detail with respect to FIG. 2.

The identification module 122 determines if the biometric data 106 provided by a biometric input device 104 is associated with a user account 126. In one implementation, the identification module 122 may comprise one or more trained machine learning systems, such as deep convolutional neural networks. For example, the biometric data 106 may comprise a query representation that is indicative of features present in an image of a user's 102 hand. If the query representation is within a threshold distance within a representation space to previously stored representation data, the user account 126 associated with that previously stored representation data may be deemed to be associated with the user 102 associated with the query representation. Once the identification module 122 asserts that the user 102 is associated with a particular user account 126, the BIP 120 may perform various operations. For example, the BIP 120 may respond to an authorization request 108 using data associated with the user account 126.

The PAOF 180 may comprise a preferred credit card number, debit card number, bank account number, cryptocurrency address, and so forth that is associated with a particular user account 126. The user 102 may provide the PAOF 180 during setup to use the BIP 120 or subsequent setup to pay for purchases using the payment system 100. In some implementations, the PAOF 180 may be associated with an entity that is associated with the user 102. For example, the PAOF 180 may be provided by the user's legal guardian, employer, and so forth for use by the user 102.

The user account 126 may be associated with one or more SUTs 128. The SUTs 128 are obtained from a payment processor 170. As shown at operation "Setup (1)" a token request 138 may be sent from the BIP 120 to the payment processor 170. The payment processor 170 may respond at operation "Setup (2)" to the request by sending a set of one or more SUTs 128 that are associated with the PAOF 180 to the BIP 120. The setup process is discussed in more detail with regard to FIG. 2.

The payment token module 130 may perform various operations, such as responding to authorization requests 108. The payment token module 130 may accept as input the authorization request 108 and the associated user account 126. The payment token module 130 may retrieve, based on the user account 126, an SUT 128 that is associated with the user account 126. The payment token module 130 may also determine other data, such as information indicative of the payment processor 170 that provided the SUT 128, a timestamp, and so forth.

In some implementations, the payment token module 130 may determine if the authorization request 108 is associated with the use of the SUT 128. If not, the authorization request 108 may be sent to another module (not shown) for processing. For example, the payment token module 130 may determine that the user account 126 is associated with another payment mode, such as HCE, and if so, sends the authorization request 108 to another module for subsequent processing.

The payment token module 130 may operate in conjunction with a cryptographic module 132 that utilizes cryptographic data 134 to determine payment data 140. For example, the payment token module 130 may encrypt the SUT 128 to determine an encrypted SUT 142, encrypt the timestamp to determine an encrypted timestamp 144, and encrypt the authorization request 108 to determine an encrypted authorization request 146. The SUT 128, timestamp, and authorization request 108 may be encrypted using the same or different cryptographic keys.

Instead of sending secret data, such as the PAOF 180, the SUT 128 (encrypted as described below) is sent in the payment data 140. The token conveys no information inherently, serving as a nonce value that may be determined randomly or pseudo-randomly. The SUT 128 is "single-use" in that it is only used for a single transaction. For example, the payment processor 170 may only accept the SUT 128 for use once. This single-use nature substantially reduces the risk of a "replay attack" in which the SUT 128 is somehow intercepted and re-used.

The token acts as a surrogate for secret data that must remain secure, such as the PAOF 180. The token may improve security because, while a token may be associated with secret data, it cannot be used to derive that secret data. In the unlikely event an SUT 128 is compromised the underlying secret data such as the PAOF 180 remains secure. This improves overall robustness and reduces financial and operational losses due to a data breach. As described, to further improve security the SUT 128 may be encrypted to determine the encrypted SUT 142 that is included in the payment data 140.

The SUT 128 may be associated with a timestamp and may be assessed using one or more expiration times. For example, the SUT 128 may only be valid for use during a set time interval, such as 90 days from original issuance by the payment processor 170. In another example, the SUT 128 may only be valid for a short time interval after use by the BIP 120, such as expiring a few seconds after encryption. Expiration may be enforced by the use of the encrypted timestamp 144. For example, the payment data 140 may include an encrypted timestamp 144 generated by the BIP 120. The payment processor 170 may decrypt the timestamp 144 and determine if a difference between a current time (or time of receipt) and the timestamp in the payment data 140 is less than a threshold expiration value. If so, the payment processor 170 may continue to process the payment data 140. If not, the payment processor 170 may generate an error.

The payment data 140 may include other information. In some implementations a portion of the payment data 140 may be unencrypted. For example, an identifier indicative of the BIP 120, an index number specifying the cryptographic key(s) being used, and so forth may be provided in plaintext. In other implementations, such data may be encrypted.

The cryptographic module 132 may maintain in the cryptographic data 134 information such as shared secrets, keys associated with public-key cryptography such as public keys and private keys, and so forth. For example, a cryptographically secure relationship may be established between different pairs of BIPs 120 and payment processors 170. Each cryptographically secure relationship may be implemented by generation of a private key and a public key by a party such as the BIP 120 or the payment processor 170 and sharing of the public key with the other party. For example, the BIP 120 may generate a first public key/private key pair, retain the first private key and send the first public key to the payment processor 170. Continuing the example, the payment processor 170 may generate a second public key/private key pair, retain the first private key and send the first public key to the BIP 120. Instead of, or in addition to the use of the public key/private key pairs, other information such as seed values, shared secrets, and so forth may be exchanged via a trusted channel between the BIP 120 and the payment processor 170.

During operation one or more elements of the system 100, such as the BIP 120 and the payment processor 170, may utilize time data from authoritative source(s). For example, timestamps may be generated based on clocks that are synchronized to a stratum 0 timekeeping source such as a global navigation satellite system that utilizes atomic clocks. In another example, timestamps that have been received from another party may be compared to time data from an authoritative source to determine if they are deemed to be within a valid time interval or have expired.

As shown in FIG. 1, the user 102 has presented their hand to the biometric input device 104. The biometric input device 104 has determined the biometric data 106 and the authorization request 108. The biometric input device 104 uses a first communication interface to send the biometric data 106 and the authorization request 108 to the BIP 120. For example, the first communication interface may comprise a wireless local area network (WLAN) interface such as WiFi or a cellular data network interface.

As described above, the BIP 120 determines payment data 140 comprising the encrypted SUT 142 and the encrypted timestamp 144. The payment data 140 is sent from the BIP 120 to the biometric input device 104. For example, the biometric input device 104 may receive the payment data 140 using the first communication interface.

The biometric input device 104 determines a protocol package 150 for transmission to the PPT 160 using a second communication interface. The protocol package 150 may comprise a protocol header 152 and the payment data 140. For example, the protocol header 152 may comprise an identifier indicative of the BIP 120 that is associated with the biometric input device 104. The protocol package 150 is discussed in more detail with regard to FIG. 3.

The second communication interface and the protocol used by the biometric input device 104 may be compliant with at least a portion of the ISO/IEC 14443 specification as promulgated by the International Organization for Standardization (ISO) and the International Electrotechnical Commission (IEC). For example, this specification may be used for contactless mass transit access card applications. By using a specification such as ISO/IEC 14443 the biometric input device is able to communicate the payment data 140 to a wide variety of different PPTs. The second communication interface may use a radio frequency wireless transmission having a carrier frequency that is less than 30 megahertz (MHz). Such transmission may utilize a near-field effect, such as associated with near-field communications (NFC). The overall effective range of such transmission may be relatively short, such as less than one meter during normal operation.

The payment data 140 may be structured to minimize transmission time via the second communication interface. For example, the payment data 140 may be structured to have an overall size in bits that is able to be transmitted in less than a threshold time, such as 200 milliseconds.

In one implementation the second communication interface may be compliant with the "MIFARE Classic" (trademark of NXP B.V.) promulgated by NXP Semiconductors N.V. In this implementation, the protocol header 152 may be compliant with the "MIFARE Classic" implementation. Also in this implementation, the payment data 140 may be structured accordingly. For example, to meet a specified threshold time to send the data, the "MIFARE Classic" transmission may be limited to a payload of 4 kilobits (4096 bits) or less. Accordingly, the payment data 140 may be structured to have a total length that is less than or equal to 4096 bits or 32 frames each comprising 128 bits of data. In some implementations, the payment data 140 may be structured to have a total length that is less than 1024 bits.

In other implementations the second communication interface may be compliant with other protocols. For example, the second communication interface may be compliant with the "MIFARE DESFire" (trademark of NXP B.V.) promulgated by NXP Semiconductors N.V.

The PPT 160 receives the protocol package 150. In some implementations the PPT 160 may perform one or more checks on the protocol package 150. For example, the PPT 160 may inspect the protocol header 152 to determine if it contains values that have been previously configured. If yes, the PPT 160 may send the payment data 140 to the payment processor 170. If not, the PPT 160 may return an error message to the biometric input device 104.

The payment processor 170 comprises a cryptographic module 172 that utilizes cryptographic data 174, a token module 176, a datastore 178 that stores SUTs 128 and PAOF 180, and a transaction module 182.

The cryptographic module 172 and associated cryptographic data 174 may be similar to those described above with regard to the cryptographic module 132 and the cryptographic data 134. The cryptographic module 172 attempts to decrypt the payment data 140. If the decryption is successful, the decrypted data may be processed by the transaction module 182. If the decryption fails, an error message may be returned to the PPT 160, which may forward or generate an error message that is then sent to the biometric input device 104. An error message may also be provided to the BIP 120.

Once successfully decrypted, the information associated with the payment data 140, such as the SUT 128, timestamp, and authorization request 108 may be processed. For example, the timestamp(s) may be assessed to determine if the SUT 128 has expired. If the timestamp(s) has expired, an error message may be returned to the PPT 160, which may forward or generate an error message that is then sent to the biometric input device 104. An error message may also be provided to the BIP 120.

If the timestamp(s) has not expired, the SUT 128 may be assessed to determine if it is valid. For example, the transaction module 182 may compare the decrypted SUT 128 to the previously stored SUT 128 in the datastore 178. If there is a match, the SUT 128 may be deemed to be valid and the transaction module 182 may proceed to generate transaction data 184 using the associated PAOF 180. If there is not a match, an error message may be returned as described previously.

The transaction data 184 may comprise information such as the PAOF 180 and information such as whether the transaction is a purchase or a credit and the amount of the transaction. The transaction data 184 may be sent to an issuing bank 190.

Responsive to successful processing of the transaction data 184 by the issuing bank 190, settlement funds are transferred from the PAOF 180 to an account associated with a merchant, such as at the issuing bank 190 or another financial institution. In the situation where the user 102 has purchased something, the merchant now has possession of the funds for that purchase and the PAOF 180 that is associated with the user account 126 and the user 102 has been debited those funds.

In some implementations, a message indicative of successful processing may be returned to participating devices or systems. For example, the issuing bank 190 may send a transaction complete message to the payment processor 170. The payment processor 170 may send a transaction complete message to the PPT 160. The PPT 160 may send a transaction complete message to the biometric input device 104. The biometric input device 104 may send a transaction complete message to the BIP 120. In another example, the payment processor 170 may send a transaction complete message to the BIP 120.

Because the underlying PAOF 180 is used for settlement, the system 100 may support various promotional or incentive programs associated with a particular PAOF 180. For example, the issuing bank 190 may offer an incentive program for use of the PAOF 180 such as providing credits for purchases from particular types of merchants, points that may be redeemed for travel services, and so forth.

In addition to the purchase of goods or services, the system 100 may also be used to facilitate a return or other situations in which a credit is made to the user's PAOF 180. For example, a credit transaction resulting from a return of a good or service may be entered on the merchant POS system which sends an authorization request 108 indicative of a credit to the user's PAOF 180. The process as described may proceed, with funds being transferred from the merchant account to the PAOF 180.

Figure 2:
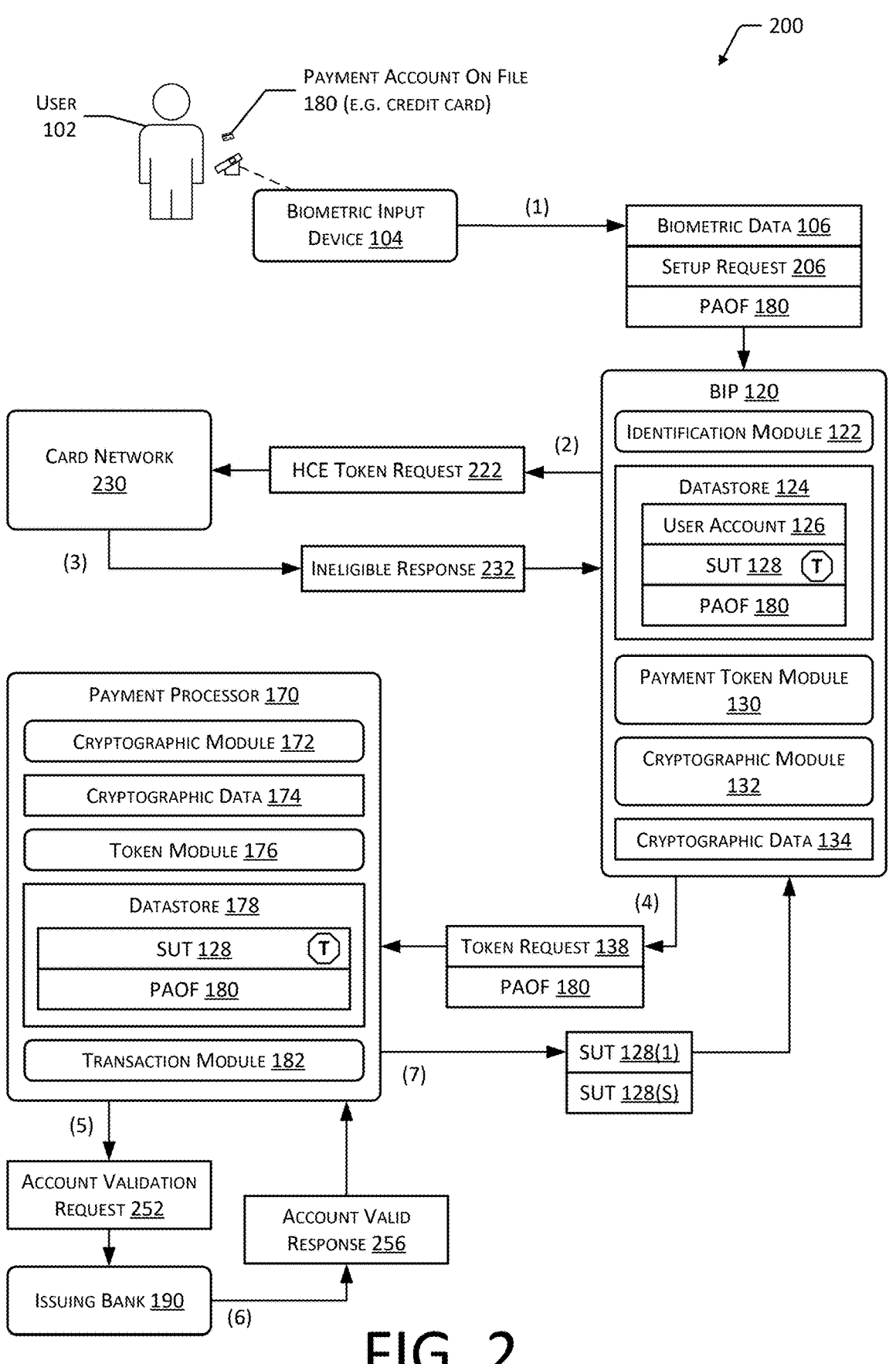
FIG. 2 illustrates user setup to use the system and provisioning of single use tokens (SUTs) for subsequent use, according to some implementations.

FIG. 2 illustrates at 200 user setup to use the system and provisioning of single use tokens (SUTs) 128 for subsequent use, according to some implementations. Unless otherwise indicated, data sent between the various parties or their associated devices may be encrypted.

In this illustration, connecting lines may include a number within parentheses that indicates an order of operations according to one implementation. For example, the operation of "(1)" occurs before "(2)". In other implementations, operations presented here may be performed in a different order or in some situations omitted. For ease of description, and not as a limitation, the term "bank" is used. It is understood that the techniques described may be used with regard to other financial institutions, such as credit unions, trust companies, mortgage loan companies, and so forth. The user setup shown at FIG. 2 may be performed before the operations shown at FIG. 1 "Payment (1)" through "Payment (5)".

The user 102 may use a biometric input device 104 to set up a PAOF 180 with the BIP 120. For example, the user 102 may add a PAOF 180 during initial enrollment to use the BIP 120, or at a later time after initial enrollment. During the enrollment process, the user 102 opts in and provides biometric data 106. In some implementations the PAOF 180 may be added using another device. For example, the user 102 may use a smartphone or laptop computer to provide the PAOF 180 to the BIP 120.

The PAOF 180 is associated with, issued by, or otherwise maintained by an entity such as a financial institution, a blockchain, and so forth. For example, the PAOF 180 may be a credit card that is issued by a first bank. Different banks may support different payment modes, with those modes comprising different technologies, protocols, procedures, and so forth. While tokenization and the use of tokens offers many advantages, some financial institutions do not yet support their use. Deployment of the needed infrastructure requires time and expense. As a result, there is a disparity between financial institutions: some support tokens while others do not. For example, some banks may support HCE tokenization, while others do not.

If the PAOF 180 is associated with a financial institution that supports a preferred payment mode, such as HCE tokenization, that preferred payment mode may be used. However, if the first financial institution does not support the first payment mode, without some other intervention the transaction desired by the user 102 would fail. To prevent such failure, the BIP 120 provides an alternative or fallback mechanism as described herein by acquiring SUTs 128 from a participating payment processor 170.

In the implementation shown, the biometric input device 104 sends biometric data 106, a setup request 206, and a PAOF 180 to the BIP 120. For example, the user 102 may "dip" or scan a payment card such as a credit or debit card at the biometric input device 104 to determine the PAOF 180. The setup request 206 may be indicative of a request to add the PAOF 180 to the user account 126 of the user 102.

The BIP 120 receives the data from the biometric input device 104 and the identification module 122 determines, based on the biometric data 106, the associated user account 126 indicative of a particular identity. Based on the setup request 206, the payment token module 130 may process the PAOF 180. In some implementations, the PAOF 180 may be assessed to determine if it supports a preferred payment mode. For example, the payment token module 130 may determine if the PAOF 180 supports HCE. The payment token module 130 may send an HCE token request 222 that includes the PAOF 180, or data based thereon, to a card network 230. If the card network 230 responds with a valid response, the payment token module 130 may use that preferred payment mode, such as HCE tokens. In the implementation shown, the card network 230 returns to the BIP 120 an ineligible response 232, indicating that the PAOF 180 associated with the HCE token request 222 does not support HCE.

Based on the ineligible response 232, the payment token module 130 determines a token request 138. The token request 138 is sent to the payment processor 170. The token request 138 may include the PAOF 180, or data indicative of the PAOF 180.

The payment processor 170 receives the token request 138 and associated PAOF 180. The payment processor 170 may determine if the PAOF 180 is valid. For example, the payment processor 170 may send an account validation request 252 to the issuing bank 190 associated with the PAOF 180. For example, the account validation request 252 may comprise a zero value account validation transaction that confirms the PAOF 180 is available for use. The issuing bank 190 may return a response, such as an account valid response 256 that indicates the PAOF 180 that was provided is deemed to be valid. If the issuing bank 190 returns an account invalid response (not shown), the setup process may stop. Error messages may be sent and returned to the BIP 120, the biometric input device 104, and so forth.

Responsive to the account valid response 256, the token module 176 associates a set of SUTs 128 with the PAOF 180. For example, the token module 176 may generate a plurality of SUTs 128 that are then associated with the PAOF 180. The set of SUTs 128 and their association to the PAOF 180 are stored in the datastore 178. The plurality of SUTs 128(1), 128 (2), . . . , 128(S) are sent from the payment processor 170 to the BIP 120 that originated the token request 138.

In some implementations the SUTs 128 may be replenished after use. For example, based on a determination that the unused SUTs 128 that are associated with a particular PAOF 180 are below a threshold count, additional SUTs 128 may be issued. For example, the BIP 120 may send a token request 138 to replenish SUTs 128 that are associated with a particular user account 126.

In some implementations the SUTs 128 may expire after a specified period of time. For example, SUTs 128 that are more than a threshold number of days old may be invalidated and replaced with newly issued SUTs 128.

In some implementations the BIP 120 may interact with a plurality of payment processors 170(1), 170(2), . . . , 170(P). The payment token module 130 may determine the appropriate payment processor 170 that is associated with the biometric input device 104 that originated the setup request 206, and send the token request 138 to the corresponding payment processor 170.

As mentioned, data sent between the various parties such as the BIP 120 and the payment processor 170 or their associated devices such as the biometric input device 104 and the PPT 160 may be encrypted using the cryptographic modules 132 and 172. The BIP 120 and the payment processor 170 may exchange cryptographic information to establish a cryptographically secure connection. The cryptographically secure connection may be used for subsequent communications. For example, the BIP 120 and the payment processor 170 may agree on a common key to enable symmetric key encryption. For example, the payment data 140 or a portion thereof may be encrypted using elliptic-curve cryptography (ECC). Elliptic-curve Diffie-Hellman (ECDH) key agreement may be implemented, using the Curve25519 as promulgated by Daniel J. Bernstein, et. al. The ECDH may be used to allow the BIP 120 and the payment processor 170 to establish a shared secret for subsequent encryption, or to derive another key for subsequent encryption suitable for symmetric key encryption. In another example, the BIP 120 and the payment processor 170 may each provide their respective public keys to the other. Continuing the example, data addressed to the other party may be encrypted before transmission using the public key of the other.

Data sent via the cryptographically secure connection may be further encrypted. For example, the token request 138 or the SUTs 128 may be encrypted before queuing for transmission via the cryptographically secure connection.

FIG. 3 illustrates at 300 part of the system 100 including the biometric input device 104, the protocol package 150, and the PPT 160, according to some implementations.

The user 102 provides biometric input, such as presenting their hand 302 to a biometric input device 104. The biometric input device 104 may comprise one or more processor(s) 306, memory(s) 308, sensor(s) 310, illuminator(s) 312, a first communication interface 314(1) and a second communication interface 316(1).

The one or more processor(s) 306 of the biometric input device 104 may perform various functions. For example, the processor 306 may operate the sensor(s) 310 and the illuminators 312 to determine the biometric data 106. The biometric data 106 is indicative of one or more features of the user 102, or a portion thereof. For example, the biometric data 106 may comprise one or more of image data, feature vectors, and so forth of a palm of the hand 302 of the user 102.

The memory 308 may comprise one or more computer-readable storage media (CRSM) that may store data, instructions, acquired sensor data, and so forth.

The one or more sensors 310 may include cameras, fingerprint readers, light sensors, and so forth. The biometric input device 104 may include one or more illuminator(s) 312, such as light emitting diodes (LEDs) that are used to illuminate the user 102, or a portion of the user 102, to facilitate acquisition of the biometric data 106 using the sensor(s) 310. The operation of the sensor(s) 310 and illuminator(s) 312 to acquire biometric data 106 is discussed in more detail with regard to FIG. 4.

The first communication interface 314 may comprise a wired or wireless interface that is used to provide communication between the biometric input device 104 and other devices of the system 100, such as computing devices associated with the BIP 120. The first communication interface 314 may also be used to communicate with a POS system. In one implementation the first communication interface 314 may comprise a wired Ethernet interface. In another implementation the first communication interface 314 may comprise a wireless local area network interface such as WiFi, a wireless wide area network interface such as a cellular network interface, and so forth.

The second communication interface 316 provides for short-range wireless communication. The second communication interface 316 may provide communication between the biometric input device 104 and the PPT 160. In some implementations, the second communication interface 316 may be used to provide communication between the biometric input device 104 and other devices, such as the POS system or a user device such as a smartphone.

The second communication interface 316 may use a radio frequency wireless transmission having a carrier frequency that is less than 30 megahertz (MHz). Such transmission may utilize a near-field effect, such as associated with near-field communications (NFC). The overall effective range of such transmission may be relatively short, such as less than one meter during normal operation with typical devices.

In one implementation, the second communication interface 316 may be compliant with at least a portion of the ISO/IEC 14443 specification. For example, this specification may be used for contactless transactions such as mass transit access cards. By using a specification such as ISO/IEC 14443 the biometric input device 104 is able to communicate with a wide variety of different PPTs 160 provided by different manufacturers. In one implementation the second communication interface 316 may be compliant with ISO/IEC layer 14443-1. In another implementation the second communication interface 316 may be compliant with ISO/IEC layer 114443-4, and so forth. In other implementations the second communication interface 316 may be compliant with other specifications.

In some implementations, the second communication interface 316 may be able to support other specifications.

For example, the second communication interface 316 may support communications associated with host card emulation (HCE) transactions.

The biometric input device 104 uses the second communication interface 316(1) to send the protocol package 150 to the PPT 160. The use of the second communication interface 316(1), such as using communication compliant with at least a portion of the ISO/IEC 14443 specification, allows the biometric input device 104 to send the payment data 140 to a wide variety of possible PPTs 160.

In the implementation shown, the protocol package 150 comprises a protocol header 152 and payment data 140. The protocol header 152 may be determined by the biometric input device 104. For example, the biometric input device 104 may receive the payment data 140 from the BIP 120 using the first communication interface 314(1), and then generate a protocol header 152 that is then used in the protocol package 150 that sends the payment data 140 to the PPT 160 using the second communication interface 316(1).

The protocol header 152 may comprise one or more fields and their associated values. The fields in the protocol header 152 may comprise one or more of a field separator 370, a token type 372, an independent software vendor (ISV) identifier 374, a payment data (or payload) length 376, and so forth. The field separator 370 may indicate the character(s) used to separate one field from another. The token type 372 may indicate if the data provided is associated with a single-use token 128. In some implementations, the token type 372 may be distinct from the SUT 128 or the encrypted SUT 142. For example, the token type 372 may have a value that indicates "single-use token" but within a context, such as with regard to the ISO/IEC 14443 specification. In some implementations the token type 372 may be set to an arbitrary value. This arbitrary value may be compared to a previously stored value, such as at the PPT 160, and further processing such as the forwarding of the payment data 140 may be contingent on that arbitrary value in the protocol header 152 matching a previously stored value.

The value of ISV identifier 374 may be used to identify an organization that is associated with an element of the system 100. For example, the biometric input device 104 may provide an ISV identifier 374 value that is indicative of the BIP 120.

The value of the payment data (or payload) length 376 may be indicative of the length of the payment data 140 that is included in the protocol package 150. The payment data length 376 may be indicated in bits, bytes, blocks, sectors, or other units that may be used by the PPT 160.

In some implementations the protocol header 152 may be unencrypted. For example, the biometric input device 104 may send the protocol header 152 in plaintext.

The protocol package 150 comprises the payment data 140. At least a portion of the payment data 140 may be encrypted. In some implementations, different portions of the payment data 140 may be encrypted using one or more different cryptographic algorithms, key values, and so forth.

The payment data 140 may comprise one or more fields and their associated values. The fields in the payment data 140 may comprise one or more of a payment processor header 380, a payment data header 382, the encrypted SUT 142, the encrypted timestamp 144, the encrypted authorization request 146, and so forth.

The payment processor header 380 may include one or more fields with values that are used by the payment processor 170. For example, the payment processor header 380 may comprise one or more of an identifier of the PPT 160. The payment processor 170 may use the information in the payment processor header 380 for further processing, to perform an initial validation of the payment data 140, and so forth.

In the implementation shown, the payment processor header 380 may be included in the payment data 140. For example, the BIP 120 may generate the payment processor header 380. In other implementations, the payment processor header 380 may be generated by the biometric input device 104, or the PPT 160.

The payment data header 382 may comprise information that is used for the subsequent processing of the encrypted SUT 142, the encrypted timestamp 144, the encrypted authorization request 146, and so forth. The payment data header 382 may comprise an originator identifier 384 that is indicative of the originator of the encrypted data. For example, the originator identifier 384 may comprise a value that is associated with the BIP 120.

The payment data header 382 may comprise one or more cryptographic index 386 values. The cryptographic indices 386 may be used to designate particular shared secrets, public/private keypairs, and so forth. In some implementations, the cryptographic index (ices) 386 may be used to refer to a particular instance of cryptographic data 134 or the cryptographic data 174. In some implementations, the combination of originator identifier 384 and the cryptographic index 386 may be used to determine the particular cryptographic data used to encrypt the information within the instance of payment data 140.

During generation of the payment data 140, the cryptographic module 132 of the BIP 120 may use the cryptographic data 134 to encrypt information within the payment data 140, such as the SUT 128, the timestamp, or the authorization request 108. The payment data header 382 may be generated by the cryptographic module 132.

The cryptographic module 172 of the payment processor 170 may then use one or more of the originator identifier 184 or the cryptographic indices 386 to determine the cryptographic data 174 that will be used to decrypt the information within the payment data 140.

The payment data header 382 may include additional information in some implementations. For example, the payment data header 382 may comprise a digital signature that was generated by the cryptographic module 132, the biometric input device 104, and so forth.

The protocol package 150 may include additional information in some implementations. For example, the protocol package 150 may include a media access control (MAC) value, an authentication value associated with the specification being used to send the protocol package 150, and so forth.

In one implementation the second communication interface 316 may be compliant with the "MIFARE Classic" (trademark of NXP B.V.) promulgated by NXP Semiconductors N.V. In this implementation, the protocol header 152 may be compliant with the "MIFARE Classic" implementation. Also in this implementation, the payment data 140 may be structured accordingly. For example, to meet a specified threshold time to send the data, the "MIFARE Classic" transmission may be limited to a payload of 4096 bits or less. Accordingly, the payment data 140 may be structured to have a total length that is less than or equal to 4096 bits.

The overall size of the payload, in particular the size of the encrypted data within the payment data 140 may be reduced by selection of particular cryptographic algorithms. The substantial computational resources available in performing cryptographic operations at the BIP 120 and the payment processor 170 may be utilized to minimize the size of the encrypted data within the payment data 140. For example, elliptic-curve cryptography may be used to minimize the size of the encrypted data, compared to other cryptographic techniques.

The PPT 160 receives the protocol package 150 via a second communication interface 316(2) that is compatible with the second communication interface 316(1) of the biometric input device 104. For example, the second communication interface 316(2) of the PPT 160 may be compliant with at least a portion of the ISO/IEC 14443 specification.

The PPT 160 may comprise one or more processor(s) 340, memory(s) 342, a first communication interface 314(2) and a second communication interface 316(2). The one or more processors 340 perform various functions. For example, the processor 340 may process the protocol package 150 received using the second communication interface 316(2). In some implementations the processor 340 may perform one or more checks to determine validity of the protocol package 150 before further processing. For example, the processor 340 may determine if one or more of the values of the protocol header 152 match previously stored values. If so, the processor 340 may perform other operations such as sending the payment data 140 to the payment processor 170.

The memory(s) 342 may comprise one or more CRSM that may store data, instructions, the protocol package 150, and so forth.

The PPT 160 may send the protocol package 150, or a portion thereof such as the payment data 140, to the payment processor 170 using the first communication interface 314 (2). For example, the PPT 160 may discard the protocol header 152 and send the payment data 140 to the payment processor 170.

In some implementations, payment data 140 sent from the PPT 160 to the payment processor 170 may include, or may be sent with, transaction details. For example, the protocol package 150 may include transactional details such as a type of transaction such as "purchase" or "return", currency, actual transaction value, placeholder transaction value, and so forth. In some implementations the transactional details may be received by the PPT 160 from another device, such as the POS system.

The communication between the PPT 160 and the payment processor 170 may be encrypted. For example, the PPT 160 may encrypt the payment data 140 before transmission to the payment processor 170.

In one implementation the second communication interfaces 316(1) and 316(2) may be compliant with the "MIFARE Classic" (trademark of NXP B.V.) promulgated by NXP Semiconductors N.V. In this implementation, the protocol header 152 may be compliant with the "MIFARE Classic" implementation. Also in this implementation, the payment data 140 may be structured accordingly. For example, to meet a specified threshold time to send the data, the "MIFARE Classic" transmission may be limited to a payload of 4096 bits or less. Accordingly, the payment data 140 may be structured to have a total length that is less than or equal to 4096 bits.

The payment data 140 may be structured to minimize transmission time via the second communication interface 316. For example, the payment data 140 may be structured to have an overall size in bits that is able to be transmitted in less than a threshold time, such as 200 milliseconds.

The devices described in this disclosure may include additional devices, such as tamper detection devices (not shown). For example, the biometric input device 104 and the PPT 160 may comprise tamper detection devices. The tamper detection devices may be configured to provide data indicative of physical or electronic tampering associated with an attempt to circumvent security features of the device. For example, the tamper detection devices may comprise electrical conductors that, when broken, signal an attempt to gain physical access to an interior of the device. In another example, the tamper detection devices may comprise a radiation sensor configured to detect x-ray radiation that may be used to non-invasively determine the structure of the device hardware. In some implementations, the device may be configured to erase data, be rendered inoperable, and so forth in the event of an actual or suspected attempt to improperly access the device or a portion thereof.

FIG. 4 illustrates at 400 several biometric input devices 104 that the payment system 100 may use, according to some implementations.

At 402 a biometric input device 104(1) is depicted that obtains images of a user's hand 302, or portion thereof such as a palm. In this illustration, the hand 302 of the user 102 is positioned above the biometric input device 104(1). The biometric input device 104(1) may include one or more illuminators 312, such as infrared (IR) light sources. For example, a first set of IR light emitting diodes (LEDs) 404(1), a second set of IR LEDs 404(2), and a third set of IR LEDS 404(3) are shown. In other implementations other devices may be used to generate infrared light. In some implementations, the wavelength of the IR light 406 may be between 750 and 1000 nanometers (nm).

The IR LED 404(1) is arranged adjacent to a first polarizer 408(1), such that IR light 406 produced by the IR LED 404(1) passes through the first polarizer 408(1). The IR light 406 that passes through the first polarizer 408(1) substantially exhibits a first polarization. Likewise, the IR LED 404(3) is arranged adjacent to a first polarizer 408(1). The biometric input device 104(1) includes a sensor such as an infrared camera 310(1) that may also have a first polarizer 408(1), such that infrared light 406 captured by the infrared camera 310(1) substantially exhibits the first polarization. In one implementation, the infrared camera 310(1) with the first polarizer 408(1) may produce a raw first modality image when the hand 302 is illuminated by the light from the IR LED 404(1) with the first polarizer 408(1) that exhibits the first polarization.

In some implementations, a plurality of IR LEDs 404 with their respective polarizers 408 may be arranged at different locations in the biometric input device 104(1) relative to the infrared camera 310(1). For example, four IR LEDs 404 with the first polarizers 408(1) may be arranged with one IR LED 404 at each corner of a square that is centered on the infrared camera 310(1). In another implementation, the IR LEDs 404 and the polarizers 408 may form a ring around the infrared camera 310(1). During operation, a computing device 412 or controller of the biometric input device 104(1) may operate the IR LEDs 404 individually or in groups to produce illumination that is either uniform or from a particular direction at different times. For example, during acquisition of raw first modality images, the IR LEDs 404 may be controlled to all be on during acquisition of one image at a first time. At a second time, selected IR LEDs 404, such as those in a particular corner of the square, may be controlled to be on during another image. By selectively illuminating the hand 302, external characteristics of the hand 302 such as ridges or creases may be enhanced due to shadow or other effects. For example, a controller of the biometric input device 104(1) may be configured to acquire one image using all IR LEDs 404 with the first polarization, then four images each using one of four IR LEDs 404 each at a different location with respect to the infrared camera 310(1), followed by an image with the IR LED 404 that produces IR light 406 with a second polarization.

The biometric input device 104(1) includes a second IR LED 404(2) that is arranged adjacent to a second polarizer 408(2), such that the IR light 406 produced by the IR LED 404(2) passes through the second polarizer 408(2) substantially exhibits a second polarization. In one implementation, the infrared camera 310(1) may produce a raw second modality image when the hand 302 is illuminated by the light from the IR LED 404(2) that exhibits the second polarization. A field of view (FOV) 414 indicates a region which is illuminated by the IR LEDs 404 and from which images from the infrared cameras 310(1) may be obtained. In implementations involving multiple sensors 310 such as infrared cameras 310(1) and visible light cameras 310(2), the FOV 414 is inclusive of the individual FOV 414 of each of the sensors 310. For example, the FOV 414 of each of the sensors 310 may overlap.

During operation, a computing device 412 or controller of the biometric input device 104(1) may operate the IR LEDs 404 that produce IR light 406 with the different polarizations and the infrared camera 310(1) to acquire images of the hand 302 as illuminated by the different polarizations of light. For example, at a first time the IR LED 404(1) may be active and the infrared camera 310(1) acquires the raw image data. Continuing the example, at a second time the IR LED 404(1) may be inactive, the IR LED 404(2) may be active, and the infrared camera 310(1) acquires raw image data. The raw image data may comprise a stream of raw first modality image, raw second modality image, raw first modality image, raw second modality image, and so forth.

The infrared camera 310(1) may comprise detectors that are responsive to at least the IR light 406 being used. The infrared camera 310(1) may be able to generate images at various frame rates. For example, the infrared camera 310(1) may be able to generate an image every $\frac{1}{20}$ of a second or faster, having a frame rate of 40 frames per second (FPS). An integration time (or exposure time) of the cameras 310 specifies the amount of time that photons are measured by the detectors to generate a single image. As the integration time decreases, the system may be less prone to blurring due to motion of the hand 302.

In some implementations, a polarized light source may be used, and the polarizer 408 adjacent to the light source omitted. For example, a quantum dot may emit IR light 406 with a particular polarization. Likewise, in some implementations, the infrared camera 310(1) may include a detector that is sensitive to, or provides information indicative of, polarization of captured light and the polarizer 408 omitted.

The polarizer 408 may comprise a filter that is substantially transmissive to light of a particular polarization, while substantially absorbing or reflecting light with another polarization. The polarization may be one or more of linear or circular. For example, the first polarizer 408(1) may be a linear polarizer while the second polarizer 408(2) may be a circular polarizer. In another example, the first polarization 408(1) may be a linear polarizer with a first angle and the second polarizer 408(2) may be a linear polarizer with a second angle. When linear polarization is used, the first polarization and the second polarization may be perpendicular to one another. For example, the first polarization may exhibit a first angle of 0 degrees with respect to a particular reference point, while the second polarization exhibits a second angle of 90 degrees.

The polarizer 408 may comprise a dichroic material or structure that passes light with a linear polarization. For example, the polarizer 408 may comprise aligned polyvinylene chains, silver nanoparticles embedded in a transparent substrate such as glass, and so forth. In other implementations, other polarization devices may be used, including but not limited to wire-grid polarizers, beam-splitting polarizers, quarter-wave plates, liquid crystals, photoelastic modulators, and so forth. For example, the photoelastic modulator may comprise a device that is controlled by an electrical signal which drives a piezoelectric transducer to vibrate a half wave resonant bar, such as fused silica. By changing the frequency of the signal, the frequency of the vibration produced by the transducer is changed, and the polarization of light through the resonant bar may be selected.

The raw images provided by the biometric input device 104 may undergo processing to provide a set of images obtained using the first and second polarizations 408 that contain a hand 302, ensure that the images are well illuminated and in focus, show the hand 302 in a particular orientation, show the hand 302 in a particular canonical pose, rectified, show which hand 302 is presented (left or right), and so forth. The processed images may then be assessed to determine feature vectors. For example, a neural network may be trained to produce as output a feature vector that characterizes one or more features present in the images or a portion thereof. In some implementations, different neural networks may be used to produce the respective feature vectors for portions of second modality images and portions of first modality images. The resulting feature vectors may then be used to generate a current signature that is indicative of the features of at least a portion of the hand 302 that the user 102 has presented. For example, the feature vectors obtained from different modalities may be concatenated to produce a linear vector that is used as the current signature, or another neural network may access the feature vectors as input and produce the current signature.

Identification of the user 102 who presented the hand 302 to the biometric input device 104(1) may involve the biometric processing system performing one or more comparisons to previously stored data, such as reference signatures produced from feature vectors of images obtained during a setup process. For example, the current signature may be compared to previously stored reference signatures. The reference signatures are associated with user identifiers. In one implementation, the identity may be determined based on the reference signature that is the closest in vector space to the current signature. In another implementation, identity may be determined by processing raw image data over time. For example, the confidence values associated with several different user identifiers may be determined, and as successive raw image data is processed confidence values above a threshold value may be used to register a vote for a particular user identifier. When a particular user identifier reaches a threshold number of votes, the identity associated with that user identifier may be deemed to be the identity of the user 102.

At 416 a biometric input device 104(2) is shown comprising a camera 310(2) that obtains an image of at least a portion of the user 102. For example, the biometric input device 104(2) may comprise a camera 310(2) that obtains an image of the user's face. The image may be processed to determine one or more feature vectors which may be stored to previously stored data to determine an identity of the user 102. The camera 310(2) may obtain images using one or more wavelengths of light, including but not limited to ultraviolet, visible light, or infrared. In some implementations, the biometric input device 104(2) may comprise a depth camera that is able to determine a distance from the camera 310(2) to various points on the user 102. For example, the depth camera may be used to generate a point cloud representation of the surface of the user's face that is representative of the 3D shape of the user's face.

At 418 a biometric input device 104(3) is shown comprising a fingerprint scanner. The biometric input device 104(3) is configured to acquire fingerprint data. The biometric input device 104(3) may use an optical, ultrasonic, capacitive, resistive, or other detector to obtain an image or other representation of features of a finger. For example, the biometric input device 104(3) may comprise a capacitive sensor configured to generate an image of features associated with the fingerprint of the user 102.

In other implementations, other biometric input devices 104 may be used to generate biometric data 106 about one or more features of the user 102. For example, a microphone may be used to acquire sound data representative of an utterance by the user 102. The sound data may be processed to determine an identity of the user 102. In some implementations, a combination of the sound of the voice and the utterance of a particular phrase may be used in combination to determine identity. For example, the user 102 may utter a particular phrase, and the sound and content of that utterance is used to identify the user 102.

Figure 5:
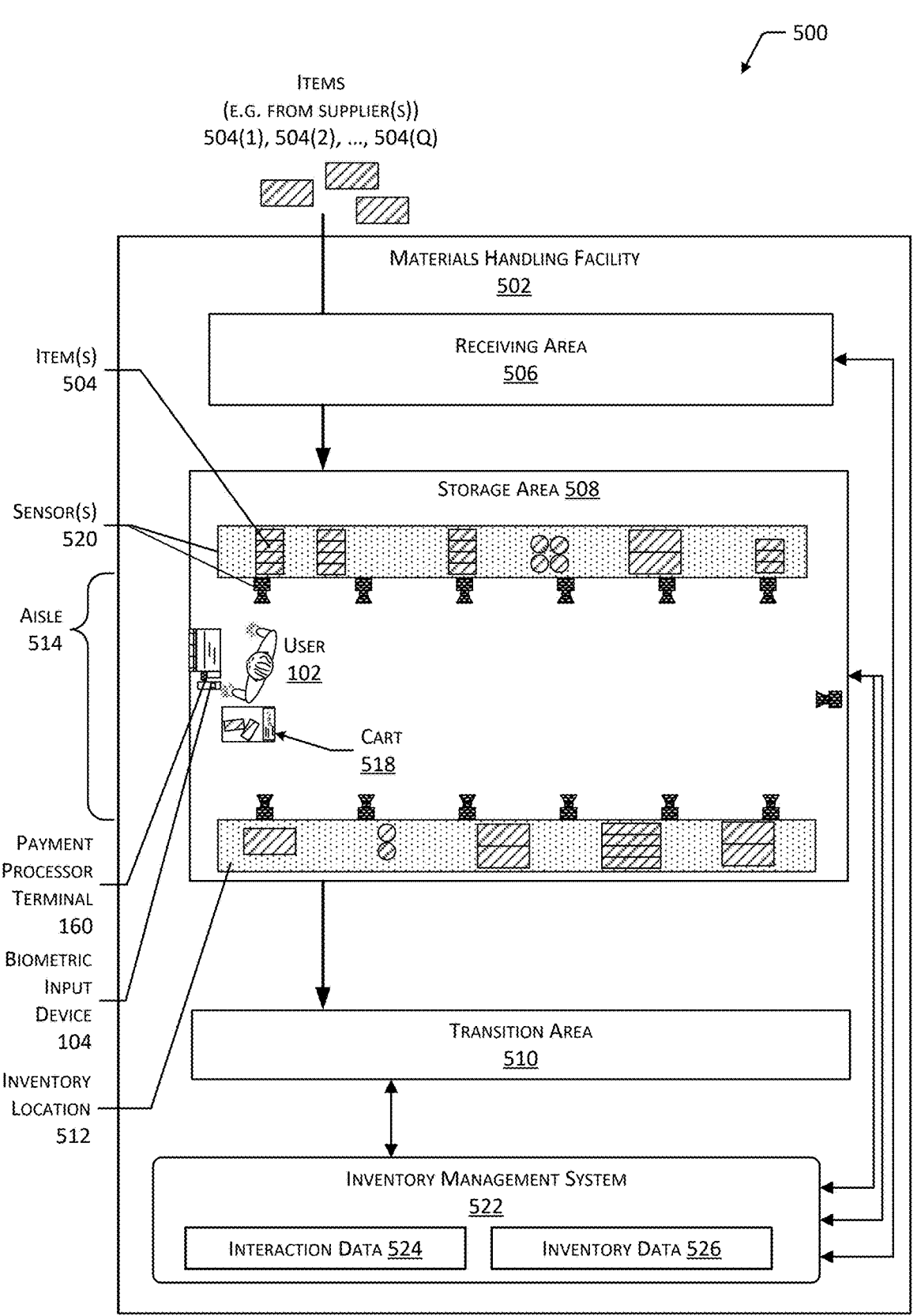
FIG. 5 is a block diagram illustrating a materials handling facility (facility) using the token-based biometric payment processing system, according to some implementations.

FIG. 5 is a block diagram 500 illustrating a materials handling facility (facility) 502 using the token-based biometric payment processing system 100, according to some implementations. A facility 502 comprises one or more physical structures or areas within which one or more items 504(1), 504(2), . . . , 504(Q) may be held. The items 504 may comprise physical goods, such as books, pharmaceuticals, repair parts, electronic gear, and so forth.

The facility 502 may include one or more areas designated for different functions with regard to inventory handling. In this illustration, the facility 502 includes a receiving area 506, a storage area 508, and a transition area 510.

The facility 502 may be configured to receive different kinds of items 504 from various suppliers and to store them until a customer orders or retrieves one or more of the items 504. A general flow of items 504 through the facility 502 is indicated by the arrows of FIG. 5. Specifically, as illustrated in this example, items 504 may be received from one or more suppliers, such as manufacturers, distributors, wholesalers, and so forth, at the receiving area 506. In various implementations, the items 504 may include merchandise, commodities, perishables, or any suitable type of item 504, depending on the nature of the enterprise that operates the facility 502. Upon being received from a supplier at the receiving area 506, the items 504 may be prepared for storage in the storage area 508. For example, in some implementations, items 504 may be unpacked or otherwise rearranged. The receiving area 506 may be configured to accept items 504, such as from suppliers, for intake into the facility 502. For example, the receiving area 506 may include a loading dock at which trucks or other freight conveyances unload the items 504. After arriving through the receiving area 506, items 504 may be stored within the storage area 508. In some implementations, like items 504 may be stored or displayed together in inventory locations 512 such as in bins, on shelves, hanging from pegboards, and so forth. In this implementation, all items 504 of a given kind are stored in one inventory location 512. In other implementations, like items 504 may be stored in different inventory locations 512. For example, to optimize retrieval of certain items 504 having frequent turnover within a large physical facility 502, those items 504 may be stored in several different inventory locations 512 to reduce congestion that might occur at a single inventory location 512.

In some implementations, the items 504 may be processed, such as at the receiving area 506, to generate item data. For example, an item 504 may be weighed, imaged or otherwise scanned to develop reference images or representations of the item 504 at the receiving area 506. In some implementations, a tag on the item 504 may be read to identify the type of item during the receiving process. In one implementation, the items 504 may have the tags applied in the receiving area 506. In another implementation, the tags may be applied by the manufacturer of the item 504, at a transshipment point, and so forth, and the items 504 may arrive with the tags already applied.

The item data provides information about the characteristics of a particular type of item 504. These characteristics may include weight of the item 504 individually or in aggregate. For example, the item data may comprise information indicative of tag data associated with an item 504, a weight of a single item 504, or a package, kit, or other grouping considered to be a single item 504. Other information such as weight distribution may also be stored.

The tag data may include an item identifier. The item identifier may be used to distinguish one type of item 504 from another. For example, the item identifier may include a stock keeping unit (SKU) string, Universal Product Code (UPC) number, and so forth. The items 504 that are of the same type may be referred to by the same item identifier. For example, cans of beef flavor Brand X dog food may be represented by the item identifier value of "9811901181". In other implementations, non-fungible items 504 may each be provided with a unique item identifier, allowing each to be distinguished from one another.

The item data may include data about other characteristics, such as information about appearance for use in machine vision or manual recognition. For example, the item data may include sample images of the type of item 504, three-dimensional point cloud data for the item 504, and so forth. The sample image data may comprise one or more images of one or more of that type of item 504. For example, sample image data may be obtained during processing or intake of the item 504 to be used by the facility 502.

The item data may include other information about the appearance. For example, a plurality of local descriptor values may be generated by feature extraction algorithms, parameters for classifiers, neural network configuration data, and so forth, that characterize the appearance of a representative of one or more of the item 504.

The item data may include one or more of geometry data. The geometry data may include information indicative of size and shape of the item 504 in one, two, or three dimensions. For example, the geometry data may include the overall shape of an item 504, such as a cuboid, sphere, cylinder, and so forth. The geometry data may also include information such as length, width, depth, and so forth, of the item 504. Dimensional information in the geometry data may be measured in pixels, centimeters, inches, arbitrary units, and so forth. The geometry data may be for a single item 504, or a package, kit, or other grouping considered to be a single item 504.

The item data may indicate the types and quantities of items 504 that are expected to be stored at that particular inventory location 512 such as in a particular lane on a shelf. The item data may include one or more inventory location identifiers (IDs). The inventory location ID is indicative of a particular area or volume of an inventory location 512 such as a shelf that is designated for stowage of the type of item 504. For example, a single shelf may have several lanes, each with a different inventory location ID. Each of the different inventory location IDs may be associated with a lane having a particular area on the shelf designated for storage of a particular type of item 504. A single type of item 504 may be associated with a particular inventory location ID, a plurality of inventory location IDs may be associated with the single type of item 504, more than one type of item 504 may be associated with the particular inventory location ID, and so forth.

The storage area 508 is configured to store the items 504. The storage area 508 may be arranged in various physical configurations. In one implementation, the storage area 508 may include one or more aisles 514. The aisle 514 may be configured with, or defined by, inventory locations 512 on one or both sides of the aisle 514. The inventory locations 512 may include one or more of a shelf, a rack, a case, a cabinet, a bin, a floor location, or other suitable storage mechanisms for holding, supporting, or storing the items 504. For example, the inventory locations 512 may comprise shelves with lanes designated therein. The inventory locations 512 may be affixed to the floor or another portion of the structure of the facility 502. The inventory locations 512 may also be movable such that the arrangement of aisles 514 may be reconfigurable. In some implementations, the inventory locations 512 may be configured to move independently of an outside operator. For example, the inventory locations 512 may comprise a rack with a power source and a motor, operable by a computing device to allow the rack to move from one location within the facility 502 to another.

One or more users 102(1), 102(2), . . . , 102(U) and carts 518(1), 518(2), . . . , 518(T) or other material handling apparatus may move within the facility 502. For example, the user 102 may move about within the facility 502 to pick or place the items 504 in various inventory locations 512, placing them on the cart 518 for ease of transport. The cart 518 is configured to carry or otherwise transport one or more items 504. For example, the cart 518 may include a basket, bag, bin, and so forth. In some implementations, the cart 518 may include a camera. For example, as items 504 are placed into or removed from the cart 518, the camera may be used to acquire the image data that is then used to read the tags and generate tag data. The tag data may then be used to determine the items 504 that are in the cart 518.

Other material handling apparatuses such as robots, forklifts, cranes, aerial drones, and so forth, may move about the facility 502 picking, placing, or otherwise moving the items 504. For example, a robot may pick an item 504 from a first inventory location 512(1) and move the item 504 to a second inventory location 512(2).

One or more sensors 520 may be configured to acquire information in the facility 502. The sensors 520 may include the camera described above. Other sensors 520, such as cameras, weight sensors, and so forth may also be used. The sensors 520 may be stationary or mobile, relative to the facility 502. For example, the inventory locations 512 may contain weight sensors to acquire weight sensor data of items 504 stowed therein and detection systems to acquire images of picking or placement of items 504 on shelves, and so forth. In another example, the facility 502 may include cameras to obtain images of the user 102 or other objects in the facility 502. The sensors 520 may be used to determine the tag data.

While the storage area 508 is depicted as having one or more aisles 514, inventory locations 512 storing the items 504, sensors 520, and so forth, it is understood that the receiving area 506, the transition area 510, or other areas of the facility 502 may be similarly equipped. Furthermore, the arrangement of the various areas within the facility 502 is depicted functionally rather than schematically. For example, in some implementations, multiple different receiving areas 506, storage areas 508, and transition areas 510 may be interspersed rather than segregated in the facility 502.

The facility 502 may include, or be coupled to, an inventory management system 522. The inventory management system 522 is configured to interact with users 102 or devices such as sensors 520, robots, material handling equipment, computing devices, and so forth, in one or more of the receiving area 506, the storage area 508, or the transition area 510.

During operation of the facility 502, the sensors 520 may be configured to provide sensor data, or information based on the sensor data, to the inventory management system 522. The sensor data may include tag data, image data, non-image data such as weight sensor data obtained from weight sensors, and so forth.

The inventory management system 522 or other systems may use the sensor data to track the location of objects within the facility 502, movement of the objects, or provide other functionality. Objects may include, but are not limited to, items 504, users 102, carts 518, and so forth. For example, a series of images acquired by a camera may indicate removal by the user 102 of an item 504 from a particular location on the inventory location 512 and placement of the item 504 on or at least partially within the cart 518. The item 504 may be identified by using the camera to produce image data that is processed to determine the tag data indicative of the tags on the item 504. The resulting tag data may be used to determine the type of item 504 that was picked or placed at the inventory location 512.

The inventory management system 522 may include one or more software applications executing on a computer system to provide inventory management functions. These inventory management functions may include maintaining information indicative of the type, quantity, condition, cost, location, weight, or any other suitable parameters with respect to the items 504. The items 504 may be stocked, managed, or dispensed in terms of countable units, individual units, or multiple units, such as packages, cartons, crates, pallets, or other suitable aggregations. Alternatively, some items 504, such as bulk products, commodities, and so forth, may be stored in continuous or arbitrarily divisible amounts that may not be inherently organized into countable units. Such items 504 may be managed in terms of a measurable quantity such as units of length, area, volume, weight, time, duration, or other dimensional properties characterized by units of measurement. Generally speaking, a quantity of an item 504 may refer to either a countable number of individual or aggregate units of an item 504 or a measurable amount of an item 504, as appropriate.

When a customer order specifying one or more items 504 is received, or as a user 102 progresses through the facility 502, the corresponding items 504 may be selected or "picked" from the inventory locations 512 containing those items 504. In various implementations, item picking may range from manual to completely automated picking. For example, in one implementation, a user 102 may have a list of items 504 they desire and may progress through the facility 502 picking items 504 from inventory locations 512 within the storage area 508 and placing those items 504 into a cart 518. In other implementations, employees of the facility 502 may pick items 504 using written or electronic pick lists derived from customer orders. These picked items 504 may be placed into the cart 518 as the employee progresses through the facility 502.

After items 504 have been picked, the items 504 may be processed at a transition area 510. The transition area 510 may be any designated area within the facility 502 where items 504 are transitioned from one location to another or from one entity to another. For example, the transition area 510 may be a packing station within the facility 502. When the item 504 arrives at the transition area 510, the item 504 may be transitioned from the storage area 508 to the packing station. Information about the transition may be maintained by the inventory management system 522.

In another example, if the items 504 are departing the facility 502, a list of the items 504 may be obtained and used by the inventory management system 522 to transition responsibility for, or custody of, the items 504 from the facility 502 to another entity. For example, a carrier may accept the items 504 for transport with that carrier accepting responsibility for the items 504 indicated in the list. In another example, a user 102 may purchase or rent the items 504 and remove the items 504 from the facility 502.

This purchase may be facilitated by the payment system 100. For example, before departing the facility 502 with the items 504, the user 102 may provide biometric input using the biometric input device 104. The biometric input device 104 may operate in conjunction with the BIP 120 and the PPT 160 as described above to provide a transaction that charges the PAOF 180 for the cost of the items 504. For example, responsive to the biometric data 106, the BIP 120 may send the payment data 140 to the biometric input device 104. The biometric input device 104 may then determine the protocol package 150 which is sent to the PPT 160 using the second communication interface 316 of the biometric input device 104. The PPT 160 may then send the payment data 140 to the payment processor 170.

During use of the facility 502, the user 102 may move about the facility 502 to perform various tasks, such as picking or placing the items 504 in the inventory locations 512. To facilitate operation of the facility 502, the inventory management system 522 is configured to use the sensor data including the tag data, weight sensor data, image data, and other information such as the item data, physical layout data, and so forth, to generate interaction data 524.

The interaction data 524 may provide information about an interaction, such as a pick of an item 504 from the inventory location 512, a place of an item 504 to the inventory location 512, a touch made to an item 504 at the inventory location 512, a gesture associated with an item 504 at the inventory location 512, and so forth. The interaction data 524 may include one or more of a type of interaction, interaction location identifier indicative of where from the inventory location 512 the interaction took place, item identifier, quantity change to the item 504, user identifier, and so forth. The interaction data 524 may then be used to further update the inventory data 526. For example, the quantity of items 504 on hand at a particular lane on the shelf may be changed based on an interaction that picks or places one or more items 504.

The inventory management system 522 may combine or otherwise utilize data from different sensors 520 of different types. For example, tag data may be used in conjunction with weight data obtained from weight sensors 520 at the inventory location 512 to determine the interaction data 524.

The inventory management system 522 may generate other data. In one implementation, user billing data may be generated that comprises a bill or invoice for the items 504 that have been taken into the custody of the user 102. For example, as the user 102 leaves the facility 502 with their cart 518, a list and cost associated with the purchase for those items 504 may be determined, taxes or other fees assessed, and that information included in the user billing data.

The inventory management system 522 may also maintain inventory data 526. For example, the inventory data 526 may comprise information such as quantity on hand at a particular inventory location 512, determine when to order additional items 504 for restock, and so forth.

In some implementations, the inventory management system 522 may use the tag data to direct the movement of items 504 within the facility 502. For example, the user 102 may be wearing an augmented reality headset that presents audible or visual information to the user 102. The system may read the tags on the item 504 and generate tag data that identifies that item 504. The inventory management system 522 may use that tag data to determine that the item 504 is to be stowed in a particular inventory location 512. The inventory management system 522 may generate instructions to present prompts to the user 102 by way of the augmented reality headset, directing the user 102 to place the item 504 in the particular inventory location 512.

The processes discussed herein may be implemented in hardware, software, or a combination thereof. In the context of software, the described operations represent computer-executable instructions stored on one or more non-transitory computer-readable storage media that, when executed by one or more processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium (CRSM) may be one or more of an electronic storage medium, a magnetic storage medium, an optical storage medium, a quantum storage medium, and so forth. For example, the computer-readable storage media may include, but is not limited to, hard drives, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as illustrative forms of implementing the claims.

What is claimed is:

1. A system comprising:
a first device comprising:
   one or more first memories storing first computer-executable instructions; and
   one or more first hardware processors to execute the first computer-executable instructions to:
      determine a first payment account associated with a user account;
      determine that the first payment account does not support tokenization; and
      responsive to the determination that the first payment account does not support tokenization:
         request a single use token (SUT),
         receive the SUT,
         associate the SUT with the user account, and
         store the SUT; and
a second device comprising:
   a sensor;
   a first communication interface;
   a second communication interface;
   one or more second memories storing second computer-executable instructions; and
   one or more second hardware processors to execute the second computer-executable instructions to:
      determine an authorization request;
      determine, using the sensor, biometric data;
      send the biometric data and the authorization request, using the first communication interface, to the first device, wherein the biometric data is associated with the user account;
      receive payment data using the first communication interface, wherein the payment data comprises an encrypted SUT, and wherein the encrypted SUT represents the SUT in an encrypted form; and
      send the payment data to a third device using the second communication interface.

2. The system of claim 1, the one or more second hardware processors to execute the second computer-executable instructions to:
   determine a protocol header comprising plaintext data, wherein the protocol header comprises an identifier value that is associated with the first device; and
   send the protocol header to the third device with the payment data.

3. The system of claim 1, wherein the payment data is less than or equal to 4096 bits in length.

4. The system of claim 1, wherein the second communication interface is compliant with at least a portion of the International Organization for Standardization (ISO) 14443.

5. The system of claim 1, the one or more first hardware processors to further execute the first computer-executable instructions to:
    receive the authorization request from the second device;
    determine, based on the biometric data, that the user account is associated with the biometric data;
    retrieve, based on the user account, the SUT;
    encrypt the SUT to determine the encrypted SUT; and
    send the payment data comprising the encrypted SUT to the second device.

6. The system of claim 5, the one or more first hardware processors to further execute the first computer-executable instructions to:
    determine a first key that is associated with the SUT, wherein the first key is unique to the SUT; and
    wherein the first key is used to encrypt the SUT to determine the encrypted SUT.

7. The system of claim 5, the one or more first hardware processors to further execute the first computer-executable instructions to:
    determine a timestamp indicative of a current clock time;
    encrypt the timestamp to determine an encrypted timestamp; and
    wherein the payment data comprises the encrypted timestamp.

8. The system of claim 1, the one or more hardware processors to further execute the first computer-executable instructions to:
    establish a cryptographically secure connection with a fourth device;
    send a token request and information indicative of the first payment account to the fourth device via the cryptographically secure connection;
    receive a first set of single use tokens (SUTs) via the cryptographically secure connection, wherein the first set of SUTs comprises the SUT; and
    store the first set of SUTs, wherein the first set of SUTs are associated with the user account.

9. A computer-implemented method comprising:
    determining, at a first device, an authorization request;
    determining, at the first device, biometric data, wherein the biometric data is associated with a user account, and wherein the user account is associated with a first payment account;
    sending the biometric data and the authorization request from the first device using a first communication interface;
    receiving payment data at the first device using the first communication interface, wherein the payment data comprises an encrypted single use token (SUT), wherein the encrypted SUT is used as a result of the first payment account not supporting tokenization, and wherein use of the encrypted SUT allows a payment transaction to be completed for the user account even though the first payment account does not support tokenization;
    determining, at the first device, a protocol header comprising plaintext;
    determining, at the first device, a protocol package comprising the protocol header and the payment data; and
    sending the protocol package from the first device using a second communication interface.

10. The computer-implemented method of claim 9, wherein the payment data is less than or equal to 4096 bits in length.

11. The computer-implemented method of claim 9, wherein the second communication interface is compliant with at least a portion of the International Organization for Standardization (ISO) 14443.

12. The computer-implemented method of claim 9, further comprising:
    determining, at a second set of devices, that the first payment account, associated with the user account, does not support tokenization;
    associating, at the second set of devices, a SUT with the user account;
    receiving, at the second set of devices, the authorization request from the first device;
    determining, at the second set of devices, the user account that is associated with the biometric data;
    retrieving, at the second set of devices, the SUT based on the user account;
    encrypting the SUT at the second set of devices to determine the encrypted SUT; and
    sending the payment data comprising the encrypted SUT from the second set of devices to the first device.

13. The computer-implemented method of claim 9, further comprising:
    determining, at a second set of devices, that the first payment account associated with the user account does not support tokenization;
    sending, from the second set of devices, a token request and information indicative of the first payment account to a third device;
    receiving, at the second set of devices, a first set of single use tokens (SUTs), wherein the first set of SUTs comprises the SUT; and
    storing, at the second set of devices, the first set of SUTs wherein the first set of SUTs are associated with the user account.

14. The computer-implemented method of claim 9, further comprising:
    determining, at a second set of devices, a first key that is associated with the SUT, wherein the first key is unique to the SUT; and
    encrypting the SUT using the first key to determine the encrypted SUT.

15. The computer-implemented method of claim 9, further comprising:
    determining, at a second set of devices, a timestamp indicative of a current clock time;
    encrypting, at the second set of devices, the timestamp to determine an encrypted timestamp; and
    wherein the payment data comprises the encrypted timestamp.

16. A system comprising:
    a first device comprising:
        an infrared camera;
        a first communication interface;
        a second communication interface;
        a first set of one or more memories storing first computer-executable instructions; and
        a first set of one or more hardware processors to execute the first computer-executable instructions to:
            determine an authorization request;
            determine, using the infrared camera, biometric data, wherein the biometric data is associated with a user account, and wherein the user account is associated with a first payment account;

send the biometric data and the authorization request, using the first communication interface, to a second device;

receive payment data using the first communication interface, wherein the payment data comprises an encrypted single use token (SUT) and an encrypted timestamp, wherein the encrypted SUT is used as a result of the first payment account not supporting a particular protocol, and wherein use of the encrypted SUT allows a payment transaction to be completed for the user account even though the first payment account does not support the particular protocol;

determine a protocol header comprising plaintext data; and send the protocol header and the payment data to a third device at a frequency that is less than 30 megahertz using the second communication interface.

17. The system of claim 16, wherein the payment data during transmission is encapsulated within at most 32 frames.

18. The system of claim 16, wherein the second communication interface is compliant with at least a portion of the ISO/IEC 14443 standard promulgated by the International Organization for Standardization.

19. The system of claim 16, the second device comprising:

a second set of one or more memories storing second computer-executable instructions; and a second set of one or more processors to execute the second computer-executable instructions to:

determine that the first payment account, associated with the user account, does not support the particular protocol, wherein the particular protocol involves tokenization;

associate a SUT with the user account;

receive the authorization request from the first device;

determine, based on the biometric data, that the user account is associated with the biometric data;

retrieve, based on the user account, the SUT;

encrypt the SUT to determine the encrypted SUT; and send the payment data comprising the encrypted SUT to the first device.

20. The system of claim 19, the second set of one or more processors to further execute the second computer-executable instructions to:

determine a first key that is associated with the SUT, wherein the first key is unique to the SUT; and wherein the first key is used to encrypt the SUT to determine the encrypted SUT.

* * * * *